(12) United States Patent
Mazur et al.

(10) Patent No.: US 11,340,592 B2
(45) Date of Patent: May 24, 2022

(54) INDUSTRIAL CONTROL SYSTEM WITH MACHINE LEARNING FOR COMPRESSORS

(71) Applicant: Rockwell Automation Technologies, Inc., Mayfield Heights, OH (US)

(72) Inventors: David C. Mazur, Mequon, WI (US); Steven Marshall, Cedarburg, WI (US); Scotty Bromfield, Johannesburg (ZA); Rob Alan Entzminger, Lenxa, KS (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 37 days.

(21) Appl. No.: 16/518,523

(22) Filed: Jul. 22, 2019

(65) Prior Publication Data

US 2021/0026334 A1 Jan. 28, 2021

(51) Int. Cl.
*G05B 19/418* (2006.01)
*G05B 13/02* (2006.01)
*F04D 27/00* (2006.01)
*F04D 29/00* (2006.01)

(52) U.S. Cl.
CPC ....... *G05B 19/4184* (2013.01); *F04D 27/001* (2013.01); *F04D 29/002* (2013.01); *G05B 13/0265* (2013.01); *G05B 2219/34082* (2013.01); *G05B 2219/42155* (2013.01)

(58) Field of Classification Search
CPC .............. G05B 13/042; G05B 13/0265; G05B 19/4184
See application file for complete search history.

(56) References Cited

U.S. PATENT DOCUMENTS

| | | | | |
|---|---|---|---|---|
| 8,073,654 | B2* | 12/2011 | Drouart | G05B 17/02 702/182 |
| 2005/0165581 | A1* | 7/2005 | Roba | G05B 23/0221 702/182 |
| 2010/0262401 | A1* | 10/2010 | Pfeifer | G05B 23/024 702/182 |
| 2012/0253543 | A1* | 10/2012 | Laughman | G05B 15/02 700/300 |
| 2017/0356346 | A1* | 12/2017 | Jiang | F04D 27/0292 |
| 2018/0282633 | A1* | 10/2018 | Van de Cotte | C07C 5/333 |
| 2020/0393181 | A1* | 12/2020 | Yang | F25B 13/00 |

* cited by examiner

*Primary Examiner* — Ronald D Hartman, Jr.

(57) ABSTRACT

A compressor controller for operating a compressor within an industrial automation environment is provided. The compressor controller includes a control module, configured to control the compressor via control settings, and a machine learning module, coupled with the control module. The machine learning module is configured to receive a set of supervised data related to the compressor, and to train with the supervised data to produce a Newtonian physics model representing the inputs and outputs of the compressor within the industrial automation environment. The machine learning module is also configured to receive performance data related to the compressor, receive environment data related to the compressor, and to process the performance data and environment data to produce predicted future performance data for the compressor, and to produce control settings for the compressor.

23 Claims, 8 Drawing Sheets

INDUSTRIAL CONTROL SYSTEM WITH MACHINE LEARNING FOR COMPRESSORS

TECHNICAL BACKGROUND

Compressed air is a common energy source that is used within multiple industries and is used extensively in the mining industry. The nature of the process requires a constant supply of air at a designated pressure to ensure that operations continue as designed. Large compressors are very expensive to purchase and operate. Compressor failure also may result in long down time for the industrial operation. Also, compressors may operate over a wide range of pressures and flow rates, however some set points are more energy efficient than others. Further, the prevention of unnecessary stopping and starting of the equipment is important as this medium voltage megawatt system is not capable of frequent switching.

Overview

In an embodiment, a compressor controller for operating a compressor within an industrial automation environment is provided. The compressor controller includes a control module, configured to control the compressor via control settings, and a machine learning module, coupled with the control module. The machine learning module is configured to receive a set of supervised data related to the compressor, and to train with the supervised data to produce a Newtonian physics model representing the inputs and outputs of the compressor within the industrial automation environment.

The machine learning module is also configured to receive performance data related to the compressor, receive environment data related to the compressor, and to process the performance data and environment data to produce predicted future performance data for the compressor, and to produce control settings for the compressor.

In another embodiment, a method for operating a compressor within an industrial automation environment is provided. The method includes receiving a set of supervised data related to the compressor, and training a machine learning module with the supervised data to produce a Newtonian physics model representing the inputs and outputs of the compressor within the industrial automation environment.

The method also includes receiving performance data related to the compressor, receiving environment data related to the compressor, and processing the performance data and environment data in the trained machine learning module to produce predicted future performance data for the compressor, and to produce control settings for the compressor.

In a further embodiment, one or more non-transitory computer-readable media having stored thereon program instructions to operate a compressor within an industrial automation environment is provided. The program instructions, when executed by a computing system, direct the computing system to at least receive a set of supervised data related to the compressor, and to train a machine learning module with the supervised data to produce a Newtonian physics model representing the inputs and outputs of the compressor within the industrial automation environment.

The program instructions further direct the computer system to at least receive performance data related to the compressor, receive environment data related to the compressor, and to process the performance data and environment data in the machine learning module to produce predicted future performance data for the compressor, and to produce control settings for the compressor.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
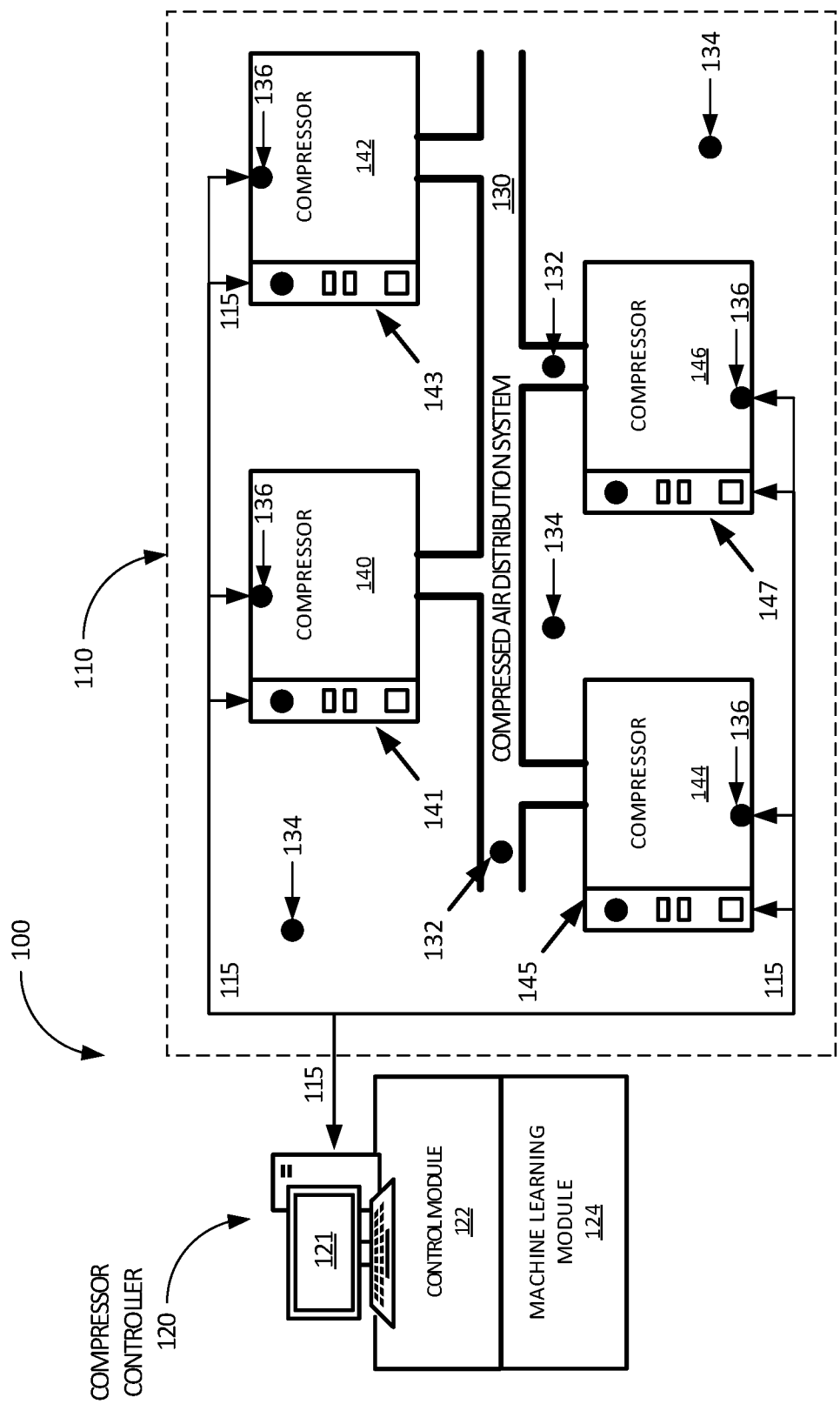
FIG. 1 illustrates an exemplary industrial automation system including a compressor controller.

FIG. 1 illustrates an exemplary industrial automation system 100 including a compressor controller 120. At a top level, this example includes compressor controller 120 and industrial automation environment 110. In this example, industrial automation environment 110 includes a number of compressors 140, 142, 144, and 146 whose outputs are all coupled to compressed air distribution system 130. Compressed air distribution system 130 may be huge and range geographically over several miles in order to provide power to various equipment within industrial automation environment 110.

In this example, each compressor is coupled with a compressor controller. Compressor 140 is coupled with compressor controller 141, compressor 142 is coupled with compressor controller 143, compressor 144 is coupled with compressor controller 145, and compressor 146 is coupled with compressor controller 147. In operation these compressor controllers may be physically located within the chassis of the compressor, adjacent to the chassis or implemented as a separate unit electrically coupled with the compressor through a link.

Also, each compressor is coupled with a vibration sensor 136 which in some examples may contain an accelerometer. In this example embodiment, vibration sensor 136 is capable of measuring vibration, acceleration, and jerk in 3-axes. This vibration data is transferred to compressor controller 120 over link 115 for use in predicting wear on the compressor.

Compressor controllers 141, 143, 145, and 147 communicate with universal compressor controller 120 over link 115. Compressor controllers 141, 143, 145, and 147 receive control settings for the compressors from universal compressor controller 120 over link 115, and transmit performance data from the compressors back to universal compressor controller 120 over link 115. This performance data includes such data as: compressor status, guide vane position, blow off valve position, discharge pressure, flow rates, power supply data, and power consumption, and the like.

Industrial automation environment 110 also includes a plurality of sensors 132 and 134 which are configured to transmit current environmental data to universal compressor control 120 over link 115 or other links (not shown). This environmental data may include such data as: temperatures, air pressures, air flows, motion, vibration, and the like.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In this example embodiment of the present invention, universal compressor controller 120 includes a display 121, control module 122, and machine learning module 124. In operation, control module 122 sends control settings to compressor controllers 141, 143, 145, and 147 over link 115.

Machine learning module 124 is coupled with control module 122, and is configured to receive a set of supervised data related to the compressor, and to train with the supervised data to produce a Newtonian physics model representing the inputs and outputs of the compressor within the industrial automation environment. Once trained, the machine learning module 124 is capable of determining optimized control settings for each of the compressors, along with predicting future performance of the compressors.

In operation, trained machine learning module 124 monitors the performance data from compressor controllers 141, 143, 145, and 147, the vibration data from sensors 136, and the environmental data from sensors 132 and 134, and processes the monitored performance data, vibration data, and environment data to determine optimized control settings for each of the compressors, along with predicted future performance of the compressors.

This predictive function allows compressor controller 120 to anticipate upcoming required maintenance and potential failures of the compressors. For example, an increase in vibrations may be indicative of bearing wear, turbine blade wear, mis-alignment of blades, and the like. By detecting these problems early, a costly failure may be avoided by prompt maintenance of the compressor. This machine learning module also allows compressor controller 120 to minimize the starts and stops of compressors 140, 142, 144, and 146, reducing wear and tear on the compressors, and to schedule maintenance of the compressors when necessary.

Figure 2:
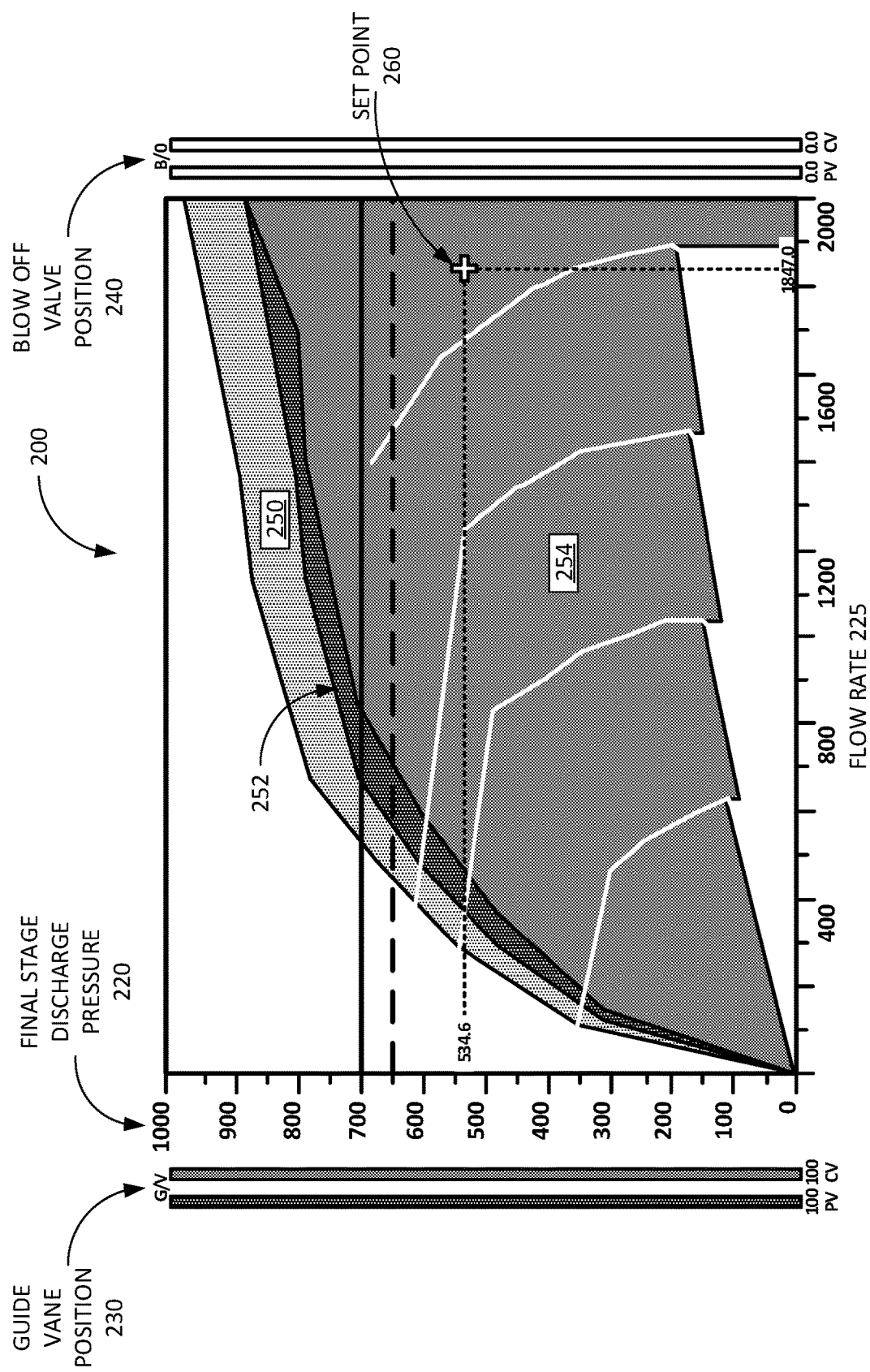
FIG. 2 illustrates an exemplary performance graph of a compressor.

FIG. 2 illustrates an exemplary performance graph 200 of a compressor 140, 142, 144, and 146. In this example, performance graph 200 provides a graphical display of the ability of a compressor to provide various air flow rates at various pressures. Here, the horizontal axis represents a flow rate 225 of the output of the compressor, while the vertical axis represents a final stage discharge pressure 220 of the compressor. When the compressor is operated at excessive pressure, a blow off valve will open and release pressure from the compressor. This overpressure region of operation 250 must be avoided. At pressures above this overpressure region 250, surge occurs.

Normal operation of the compressor occurs in region 254, while region 252 indicates less efficient operation of the compressor. Guide vane position 230 is illustrated by bar graphs on the left side of the performance graph 200, while blow off valve position 240 is illustrated by bar graphs on the right side of the performance graph 200. A current set point 260 is also shown on the performance graph.

Figure 3:
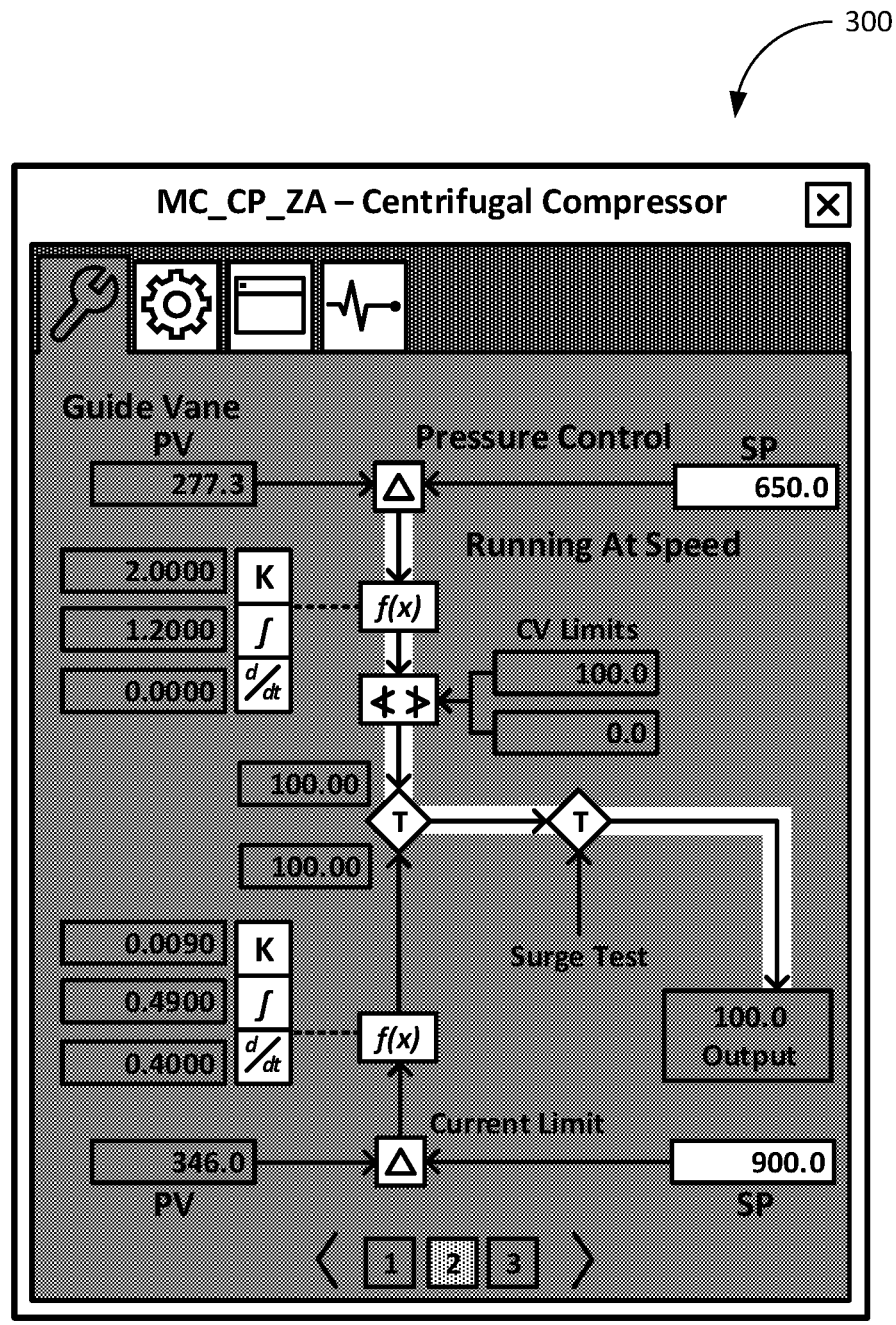
FIG. 3 illustrates an exemplary user interface for controlling a compressor.

FIG. 3 illustrates an exemplary user interface 300 for controlling a compressor. This example illustrates a user interface 300 used during compressor guide vane tuning and configuration. It illustrates some of the control settings available on the compressor to optimize efficiency and output of the compressor.

Figure 4:
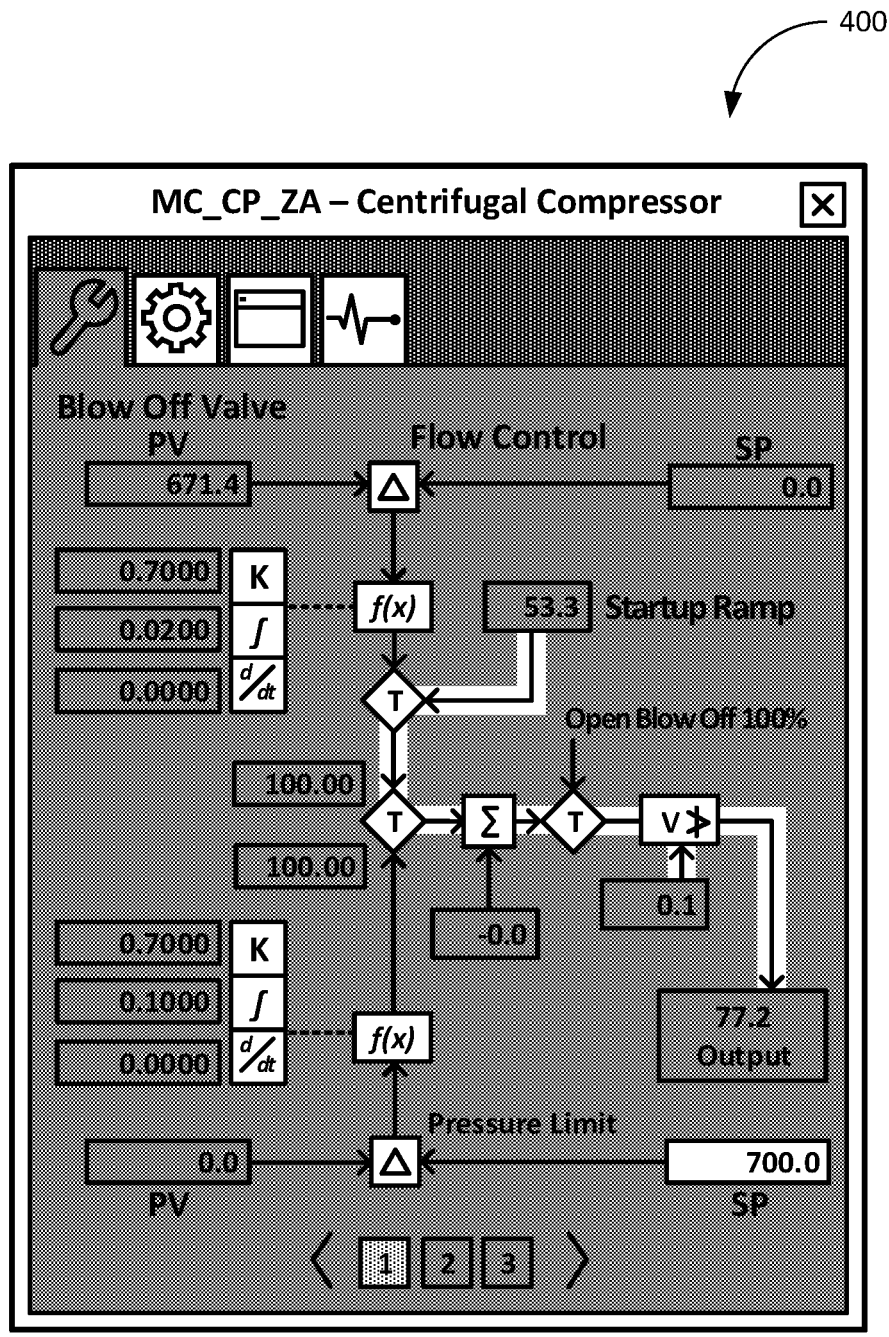
FIG. 4 illustrates an exemplary user interface for controlling a compressor.

FIG. 4 illustrates an exemplary user interface 400 for controlling a compressor. This example illustrates a user interface 400 used during compressor blow off valve tuning and configuration. It illustrates some of the control settings available on the compressor to optimize efficiency and output of the compressor.

Figure 5:
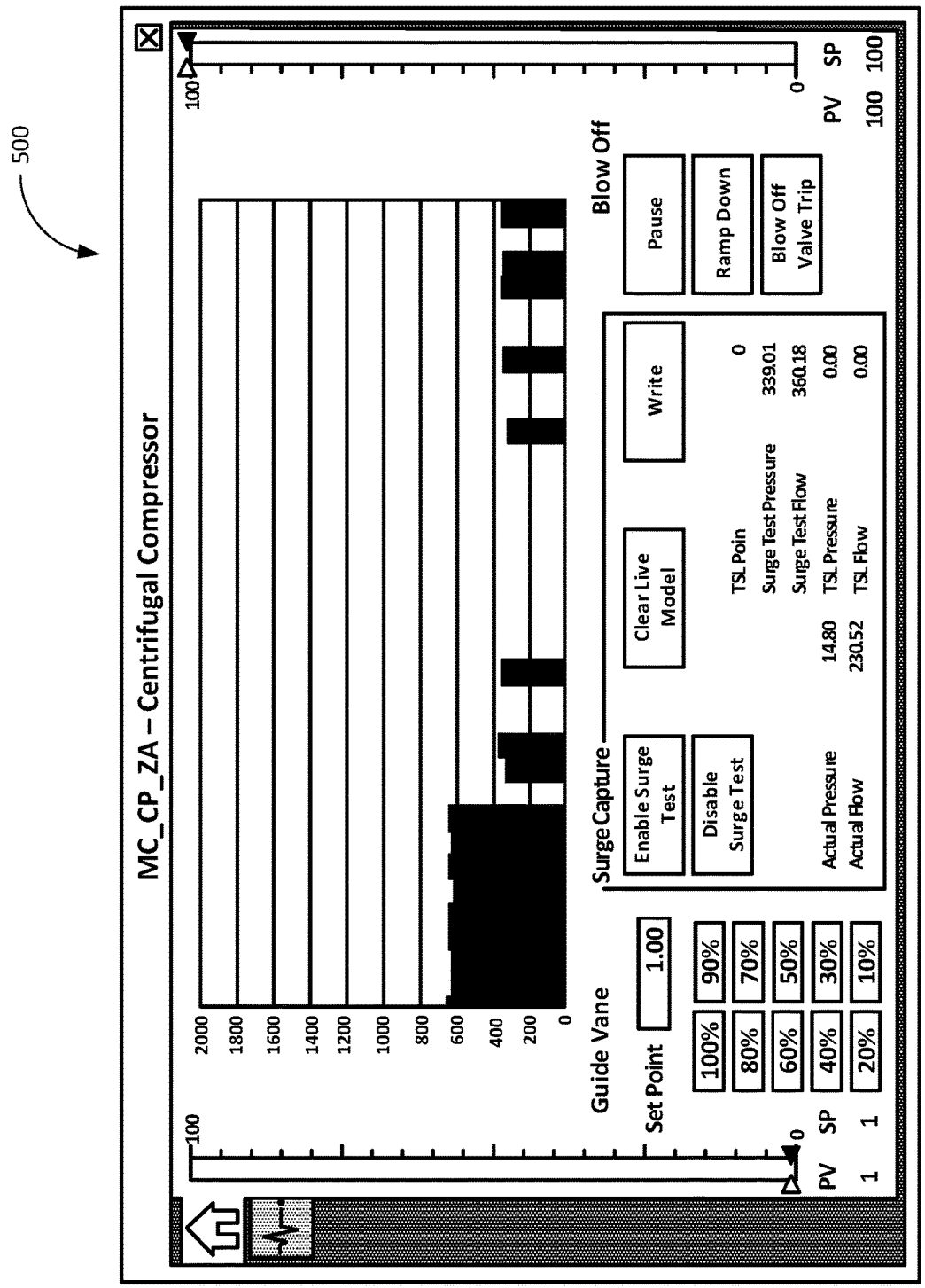
FIG. 5 illustrates an exemplary user interface for surge testing a compressor.

FIG. 5 illustrates an exemplary user interface 500 for surge testing a compressor. This example illustrates a user interface 500 used during surge testing of a compressor. Surge testing is used to generate performance graphs of the compressor, such as performance graph 200 of FIG. 2.

Figure 6:
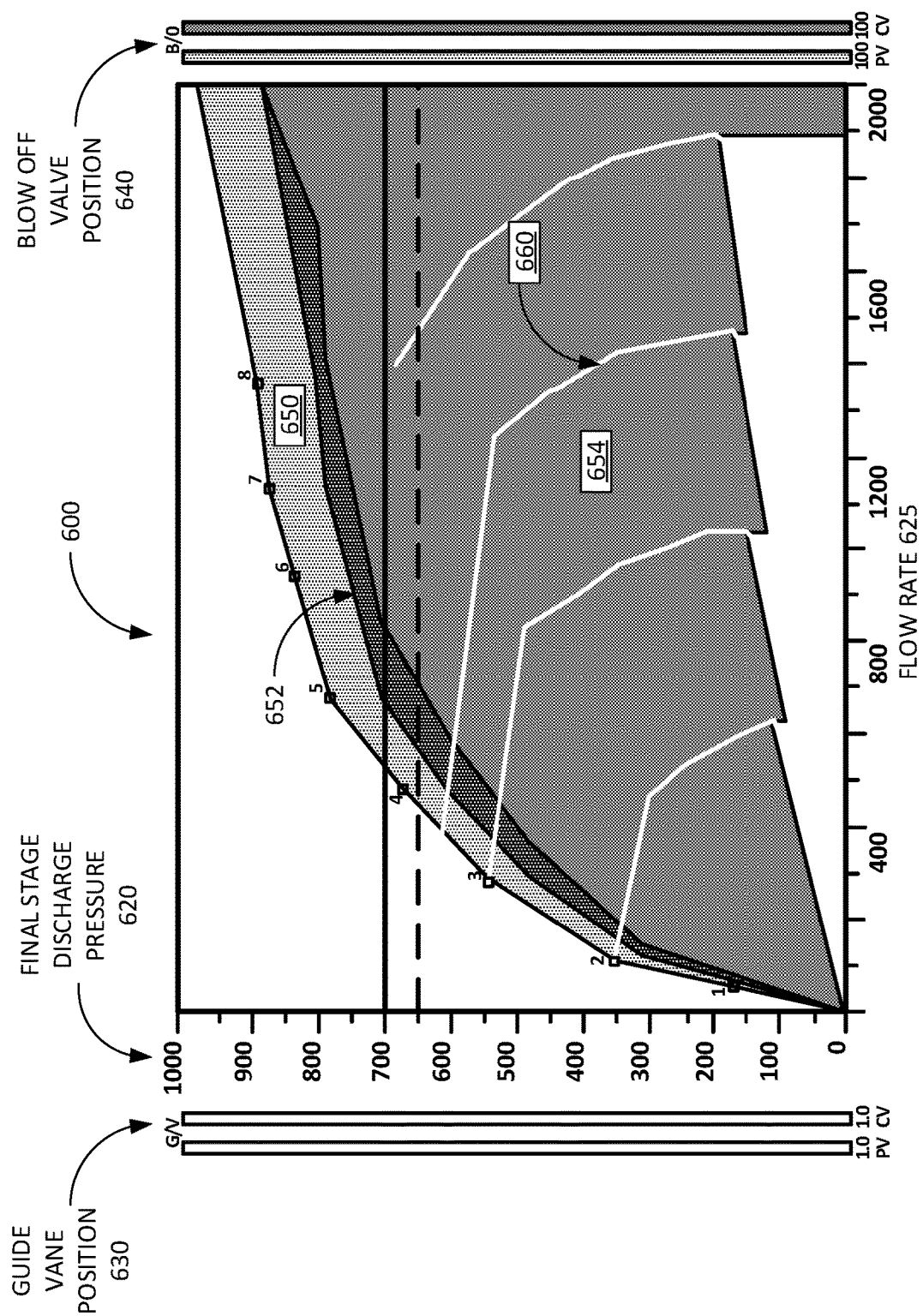
FIG. 6 illustrates an exemplary performance graph of a compressor after surge testing.

FIG. 6 illustrates an exemplary performance graph 600 of a compressor after surge testing. In this example, performance graph 600 provides a graphical display of the ability of a compressor to provide various air flow rates at various pressures, as determined via surge testing. Here, the horizontal axis represents a flow rate 625 of the output of the compressor, while the vertical axis represents a final stage discharge pressure 620 of the compressor. During surge testing, when the compressor is operated at excessive pressure, a blow off valve will open and release pressure from the compressor. This overpressure region of operation 650 must be avoided. At pressures above this overpressure region 650, surge occurs.

The white lines 660 in the graph each represent the results of a single surge test with the guide vane set at different positions for each surge test. During a surge test, the pressure within the compressor is increased (resulting in decreased flow rate) until the blow off valve opens and the compressor surges.

Normal operation of the compressor occurs in region 654, while region 652 indicates less efficient operation of the compressor. Guide vane position 630 is illustrated by bar graphs on the left side of the performance graph 600, while blow off valve position 640 is illustrated by bar graphs on the right side of the performance graph 600.

Figure 7:
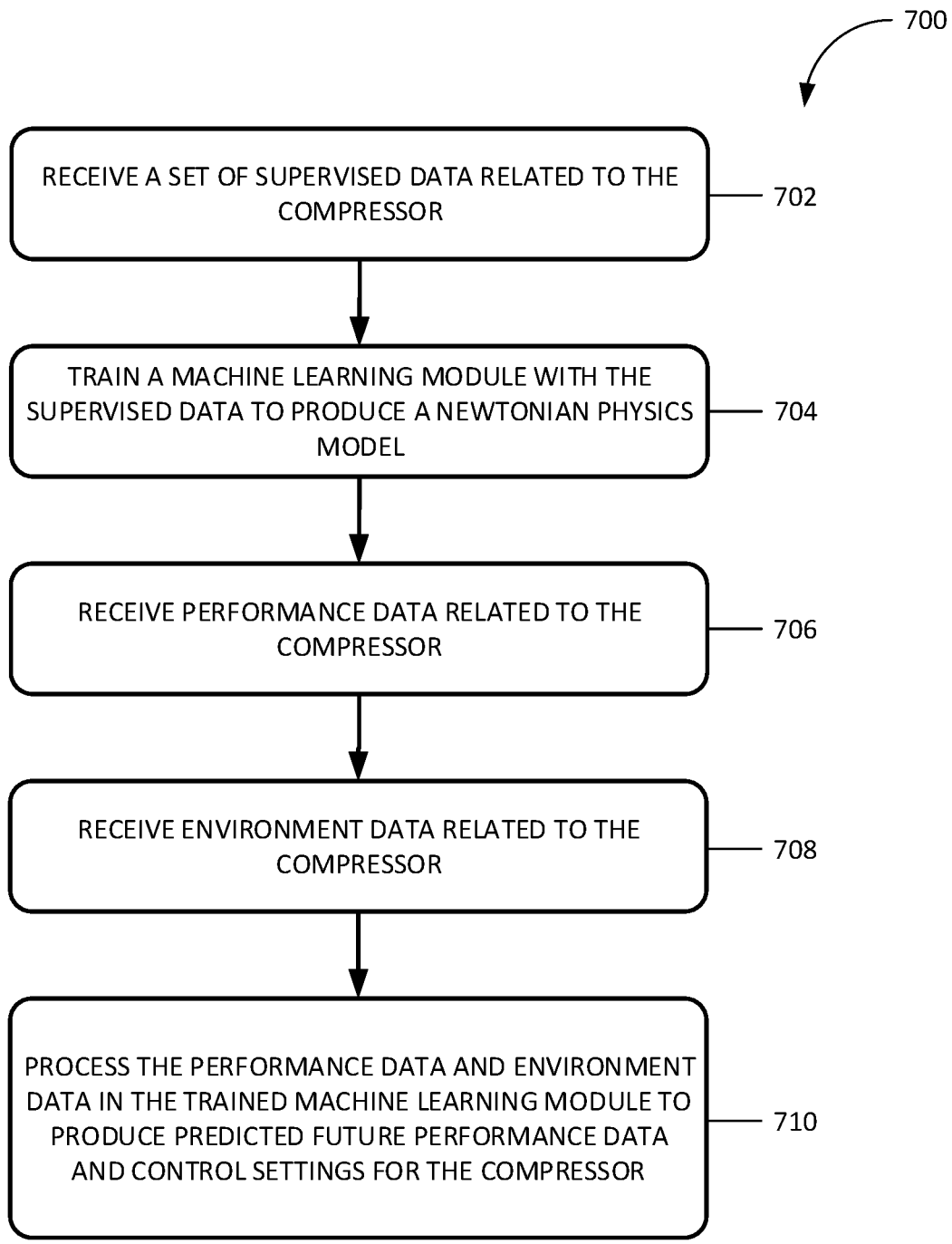
FIG. 7 illustrates a flow chart of an exemplary method for operating a compressor controller within an industrial automation environment.

FIG. 7 illustrates a flow chart 700 of an exemplary method for operating a compressor controller 120 for operating a compressor within an industrial automation environment 110.

In this example embodiment, machine learning module 124 of compressor controller 120 receives a set of supervised data related to the compressor, (operation 702). This supervised data is used to train machine learning module 124 to produce a Newtonian physics model representing the inputs and outputs of the compressor within the industrial automation environment, (operation 704).

Machine learning module 124 of compressor controller 120 receives performance data related to the compressor, (operation 706). The performance data may include such data as: compressor status, guide vane position, blow off valve position, discharge pressure, flow rates, power supply data, and power consumption.

Machine learning module 124 of compressor controller 120 receives environment data related to the compressor, (operation 708). The environment data may include various data from sensors 132 and 134, along with vibration data from vibration sensors 146.

Machine learning module 124 of compressor controller 120, once trained, processes the performance data and environment data to produce predicted future performance data for the compressor, and to produce control settings for the compressor, (operation 710). In an example, the control settings for the compressor are optimized to maximize through-put, minimize energy consumption, and to minimize starts and stops of the compressor. In a further example the future performance data comprises predictions of bearing wear, turbine blade wear, required maintenance, and failure of the compressor.

Optionally, machine learning module 124 of compressor controller 120 may produce a schedule for compressor maintenance based at least in part on the future performance data for the compressor. Also optionally, machine learning module 124 of compressor controller 120 may display a warning to a user when the future performance data predicts required maintenance or a failure in the compressor.

Figure 8:
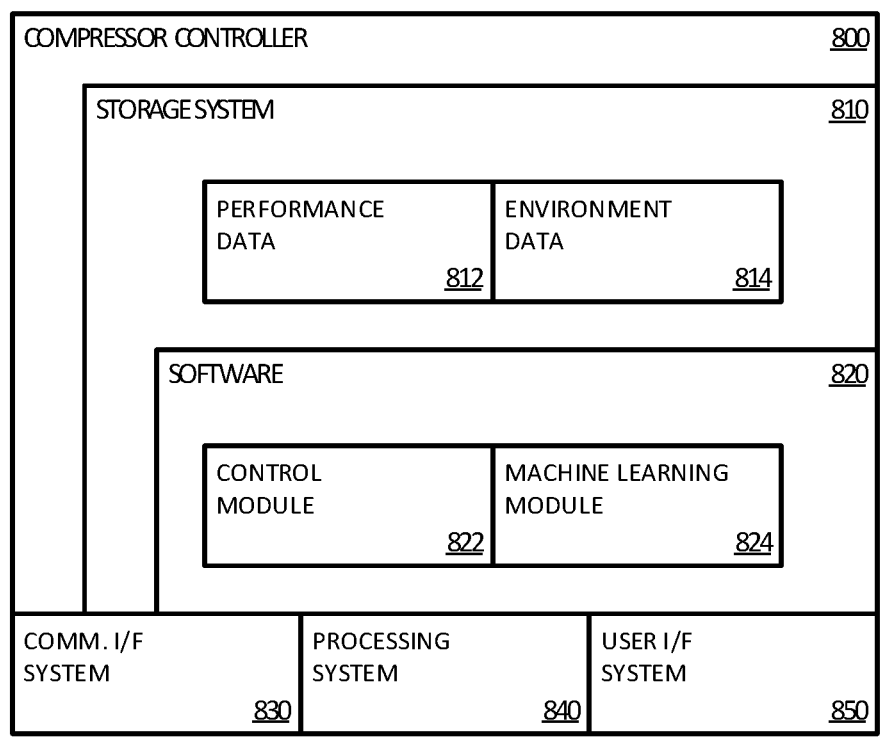
FIG. 8 illustrates an exemplary compressor controller within an industrial automation system.

FIG. 8 illustrates an exemplary compressor controller 800, such as compressor controller 120 from FIG. 1, within an industrial automation system, such as industrial automation system 100 from FIG. 1.

Compressor controller 800 includes user interface system 850, communication interface system 830, processing system 840, and storage system 810. Storage system 810 in the example shown includes software 820. In some examples, software 820 comprises control module 822 and machine learning module 724, that together configure the compressor controller 800, when executed by the compressor controller 800 in general or processing system 840 in particular, to direct compressor controller 800 to perform industrial automation operations, such as operating a compressor within an industrial automation environment as illustrated in FIG. 7.

Other data, such as performance data 812, and environment data 814, is also stored in storage system 810. In an example embodiment, performance data 812 includes such data as: compressor status, guide vane position, blow off valve position, discharge pressure, flow rates, power supply data, and power consumption, and the like, as described herein. In another example embodiment, environment data 814 includes such data as: temperatures, air pressures, air flows, motion, vibration, and the like, as described herein.

Processing system 840 may comprise a microprocessor and other circuitry that retrieves and executes software 820 from storage system 810. Processing system 840 may be implemented within a single processing device, but may also be distributed across multiple processing devices or sub-systems that cooperate in executing program instructions. Examples of processing system 840 include general purpose central processing units, application specific processors, and logic devices, as well as any other type of processing device, combinations, or variations.

Storage system 810 may comprise any computer readable storage media readable by processing system 840 and capable of storing software 820. Storage system 810 may include volatile and nonvolatile, removable and non-removable media implemented in any method or technology for storage of information, such as computer readable instructions, data structures, program modules, or other data. Storage system 810 may be independent from or integrated into processing system 840. Storage system 810 can comprise additional elements, such as a memory controller, capable of communicating with processing system 840. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 810 may also include communication media over which software 820 may be communicated internally or externally. Storage system 810 may be implemented as a single storage device but may also be implemented across multiple storage devices or sub-systems co-located or distributed relative to each other. Storage system 810 may comprise additional elements capable of communicating with processing system 840 or possibly other systems.

Software 820 may be implemented in program instructions and among other functions and may, when executed by processing system 840, direct processing system 840 to operate as described herein. In particular, the program instructions may include various components or modules that cooperate or otherwise interact to implement at least a portion of compressor controller 800. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 820 in the examples comprises computer programs, firmware, or some other form of machine-readable processing instructions. Software 820 may include an operating system, utilities, drivers, network interfaces, applications, virtual machines, or some other type of software. Software 820 may include additional processes, programs, or components, such as operating system software or other application software. Software 820 may also comprise firmware or some other form of machine-readable processing instructions executable by processing system 840.

In general, software 820, when loaded into processing system 840 and executed, may transform a suitable apparatus, system, or device from a general-purpose computing system into a special-purpose computing system customized to assist in operating a compressor within an industrial automation environment, among other operations. Indeed, encoding software 820 on storage system 810 may transform the physical structure of storage system 810. The specific transformation of the physical structure may depend on various factors in different implementations of this description. Examples of such factors may include, but are not limited to the technology used to implement the storage media of storage system 810 and whether the computer-storage media are characterized as primary or secondary storage, as well as other factors.

User interface system 850 may include communication connections and devices that allow for communication with users over a communication network or collection of networks. User interface system 850 may include user input and output devices for being controlled by a user, or these devices may be external to compressor controller 800.

User interface system 850 may comprise a network card, network interface, port, or interface circuitry that allows compressor controller 800 to communicate over a network or networks. User interface system 850 may also include a memory device, software, processing circuitry, or some other device. User interface system 850 can use any suitable communication protocol to exchange communications with a user.

User interface system 850 may include components that communicate over communication links, such as network cards, ports, RF transceivers, processing circuitry and software, or other communication components. User interface system 850 may be configured to communicate over electrically conductive, wireless, optical, or other links.

User interface system 850 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Communication interface system 830 may include communication connections and devices that allow for communication with computers, such as compressor controllers 141, 143, 145, and 147, over a backplane, a communication network, or a collection of networks.

Communication interface system 830 may comprise a network card, network interface, port, or interface circuitry that allows compressor controller 800 to communicate over a network or networks. Communication interface system 830 may also include a memory device, software, processing circuitry, or some other device. Communication interface system 830 can use any suitable communication protocol to exchange communications with another computer.

Communication interface system 830 may include components that communicate over communication links, such as network cards, ports, RF transceivers, processing circuitry and software, or other communication components. Communication interface system 830 may be configured to communicate over electrically conductive, wireless, optical, or other links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A compressor controller for operating a compressor within an industrial automation environment, the compressor controller comprising:
a control module, configured to control the compressor via control settings; and
a machine learning module, coupled with the control module, and configured to:
receive a set of supervised data related to the compressor;
train with the supervised data to produce a Newtonian physics model representing the inputs and outputs of the compressor within the industrial automation environment;
receive performance data related to the compressor;
receive environment data related to the compressor; and
process the performance data and environment data to produce predicted future performance data for the compressor, and to produce control settings for the compressor.

2. The compressor controller of claim 1, wherein the performance data comprises compressor status, guide vane position, blow off valve position, discharge pressure, flow rates, power supply data, and power consumption.

3. The compressor controller of claim 1, wherein the control settings for the compressor are optimized to maximize through-put, minimize energy consumption, and to minimize starts and stops of the compressor.

4. The compressor controller of claim 1, wherein the future performance data comprises predictions of bearing wear, turbine blade wear, required maintenance, and failure of the compressor.

5. The compressor controller of claim 1, wherein the machine learning module is further configured to:
produce a schedule for compressor maintenance based at least in part on the future performance data for the compressor.

6. The compressor controller of claim 1, wherein the machine learning module is further configured to:
display a warning when the future performance data predicts required maintenance or a failure in the compressor.

7. The compressor controller of claim 1, wherein the environment data comprises vibration data.

8. A method for operating a compressor within an industrial automation environment, the method comprising:
receiving a set of supervised data related to the compressor;
training a machine learning module with the supervised data to produce a Newtonian physics model representing the inputs and outputs of the compressor within the industrial automation environment;
receiving performance data related to the compressor;
receiving environment data related to the compressor; and
processing the performance data and environment data in the trained machine learning module to produce predicted future performance data for the compressor, and to produce control settings for the compressor.

9. The method of claim 8, wherein the performance data comprises compressor status, guide vane position, blow off valve position, discharge pressure, flow rates, power supply data, and power consumption.

10. The method of claim 8, wherein the control settings for the compressor are optimized to maximize through-put, minimize energy consumption, and to minimize starts and stops of the compressor.

11. The method of claim 8, wherein the future performance data comprises predictions of bearing wear, turbine blade wear, required maintenance, and failure of the compressor.

12. The method of claim 8, further comprising:
producing a schedule for compressor maintenance based at least in part on the future performance data for the compressor.

13. The method of claim 8, further comprising:
displaying a warning when the future performance data predicts required maintenance or a failure in the compressor.

14. The method of claim 8, wherein the environment data comprises vibration data.

15. One or more non-transitory computer-readable media having stored thereon program instructions to operate a compressor within an industrial automation environment, wherein the program instructions, when executed by a computing system, direct the computing system to at least:
receive a set of supervised data related to the compressor;
train a machine learning module with the supervised data to produce a Newtonian physics model representing the inputs and outputs of the compressor within the industrial automation environment;
receive performance data related to the compressor;
receive environment data related to the compressor; and
process the performance data and environment data in the machine learning module to produce predicted future performance data for the compressor, and to produce control settings for the compressor.

16. The one or more non-transitory computer-readable media of claim 15, wherein the performance data comprises compressor status, guide vane position, blow off valve position, discharge pressure, flow rates, power supply data, and power consumption.

17. The one or more non-transitory computer-readable media of claim 15, wherein the control settings for the compressor are optimized to maximize through-put, minimize energy consumption, and to minimize starts and stops of the compressor.

18. The one or more non-transitory computer-readable media of claim 15, wherein the future performance data comprises predictions of bearing wear, turbine blade wear, required maintenance, and failure of the compressor.

19. The one or more non-transitory computer-readable media of claim 15, further comprising program instructions, which when executed by the computing system, direct the computing system to at least:
produce a schedule for compressor maintenance based at least in part on the future performance data for the compressor.

20. The one or more non-transitory computer-readable media of claim 15, further comprising program instructions, which when executed by the computing system, direct the computing system to at least:
display a warning when the future performance data predicts required maintenance or a failure in the compressor.

21. The one or more non-transitory computer-readable media of claim 15, further comprising program instructions, which when executed by the computing system, direct the computing system to at least:
produce the predicted future performance data for the compressor.

22. The one or more non-transitory computer-readable media of claim 15, further comprising program instructions, which when executed by the computing system, direct the computing system to at least:
produce the control settings for the compressor.

23. The one or more non-transitory computer-readable media of claim 15, wherein the environment data comprises vibration data.

* * * * *